Patented Oct. 19, 1948

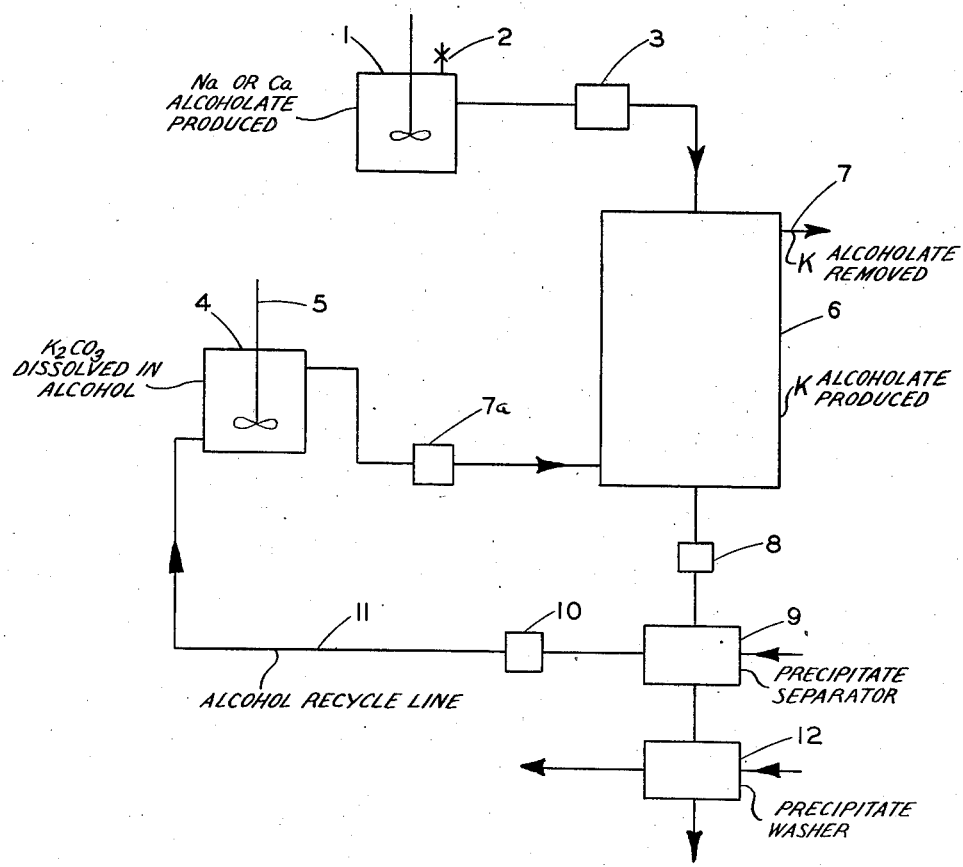

2,451,945

UNITED STATES PATENT OFFICE 2,451,945

PREPARATION OF POTASSIUM ALCOHOLATES

William E. Hanford, Easton, Pa., assignor to General Aniline & Film Corporation, New York, N. Y., a corporation of Delaware Application May 25, 1945, Serial No. 595,713

8 Claims. (Cl. 260—632)

The present invention relates to the preparation of potassium alcoholates and particularly to the preparation of potassium methylate and potassium ethylate.

The potassium alcoholates, especially of the low molecular weight alcohols such as methyl, ethyl, propyl, butyl and the like find extensive use in organic synthesis as catalysts or acid-binding agents, alkylating agents and the like. For instance, in the preparation of vinyl ethers by the reaction of acetylene with an alcohol, it has been proposed to use potassium alcoholates as the catalyst (see U. S. P. 1,959,927). Due to the importance of the potassium alcoholates, a number of methods have been devised for the preparation of the same. At least three of these methods have attained commercial status.

One of these methods involves the reaction of metallic potassium with an alcohol to form the alcoholate and hydrogen. This reaction, when using methanol as the alcohol, may be represented by the following equation:

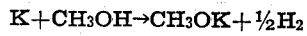

Another method involves the reaction of potassium hydroxide with an alcohol in such a manner that the water formed is continuously removed from the reaction zone. Azeotropic distillation may be resorted to for the removal of the water. This reaction, assuming that the alcohol is methanol, may be depicted as follows:

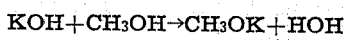

The third method involves the reaction of potassium carbonate with an alcohol to form the potassium alcoholate and potassium bicarbonate. The solution of the potassium alcoholate and potassium bicarbonate is concentrated so that potassium bicarbonate precipitates. The bicarbonate is isolated, calcined to form the carbonate and re-employed in the reaction with the alcohol. Again, assuming that the alcohol is methanol, this reaction takes place as follows:

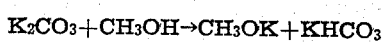

While these reactions appear simple as written in many cases under actual experimental conditions numerous by-products are formed which either consume the alcohol or do not allow the operator to readily rework sludges to recover the potassium.

The purpose of this invention is to develop a new and more practical method for the preparation of potassium alcoholates by converting sodium or calcium alcoholates into a potassium alcoholate by means of potassium carbonate. This method takes advantage of the solubility of potassium carbonate in inert solvents such as alcohols on the one hand and the insolubility of sodium or calcium carbonates in the same solvents on the other hand.

It is accordingly an object of this invention to produce potassium alcoholates by a relatively inexpensive method which insures the formation of the alcoholate in high yields.

It is a further object of this invention to produce potassium alcoholates in a condition in which they may be readily isolated from by-products of the reaction.

It is a further object of this invention to produce potassium alcoholates by reacting potassium carbonate with calcium or sodium alcoholate in a solvent for the potassium carbonate which is a non-solvent for calcium or sodium carbonate.

It is a further object of this invention to produce potassium alcoholates, particularly the methylate or ethylate by reacting potassium carbonate with either calcium or sodium alcoholate, particularly the methylate or ethylate in an anhydrous medium.

It is a further object of this invention to produce potassium alcoholate particularly the methylate or ethylate by a continuous reaction of potassium carbonate with calcium or sodium alcoholate especially the methylate or ethylate in an anhydrous medium.

It is a further object of this invention to produce potassium alcoholate particularly the methylate or ethylate by heating calcium carbide with an alcohol particularly ethyl or methyl alcohol in the presence of sodium carbonate.

It is a further object of this invention to produce potassium alcoholate, particularly the ethylate or methylate by reacting sodium alcoholate particularly the methylate or ethylate with potassium carbonate in the presence of the alcohol from which the alcoholate is formed.

Other and further important objects of the invention will be apparent as the description proceeds.

The sodium alcoholate employed may be obtained by any of the usual methods, especially by reaction of sodium metal with an alcohol. These reactions are well known in the art and hence a further description thereof is unnecessary. The alcohols which may be employed to form the alcoholate may be aliphatic such as methyl, ethyl, propyl, isopropyl, butyl, secondary butyl, tertiary butyl, dodecyl, cycloaliphatic, such as cyclohexyl, araliphatic such as benzyl and menaphthyl and the like and heterocyclic such as furfuryl and the like.

The calcium alcoholate which is utilized for reaction with potassium carbonate is preferably prepared by the reaction of calcium carbide with an alcohol as above but particularly methyl or ethyl alcohol. In this reaction, which involves the employment of an excess of the alcohol, acetylene is formed as a by-product. The acetylene may be continuously vented from the reaction mixture. By eliminating the acetylene, the equilibrium of the reaction is shifted so that the reaction goes to completion.

The reaction between the calcium carbide and the alcohol may take place at room temperature, or at elevated temperatures ranging up to the boiling point of the reaction mixture. The use of elevated temperatures is, however, preferred.

The production of the potassium alcoholate which may be effected either by a batch or continuous process as shown in the examples may be illustrated by the following equations:

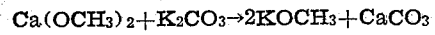
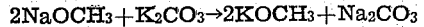

$$Ca(OCH_3)_2 + K_2CO_3 \rightarrow 2KOCH_3 + CaCO_3$$
$$2NaOCH_3 + K_2CO_3 \rightarrow 2KOCH_3 + Na_2CO_3$$

It will be observed that in these equations the quantities of the reactants are stoichiometric. It is to be pointed out, however, that the ratio of calcium or sodium alcoholate to potassium carbonate may vary considerably from such proportions. If, for instance, it is desirable to insure a complete conversion of the calcium or sodium alcoholate, then an excess of the potassium carbonate, amounting to up to 25 per cent by weight, may be employed. On the other hand, if it is desirable to secure a complete conversion of the potassium carbonate, then the excess of the alcoholate may be up to 25 per cent by weight.

The temperature at which the reaction between the potassium carbonate and the calcium or sodium alcoholate takes place will vary depending upon whether the reaction is a continuous or batch process. If the conversion is effected in a batch procedure, it is recommended that the reaction mixture be heated up to the boiling point of the same. On the other hand, if the reaction is effected by the continuous process, the reaction may take place at any temperature between room temperature and the boiling point of the reaction mixture.

It has been previously stated that the reaction is effected in the presence of a liquid which is a solvent for potassium carbonate but which is a non-solvent for sodium and calcium carbonate. In general there will be used the alcohol from which the alcoholate undergoing reaction is derived, examples of which are given above. However, other inert solvents may be employed so long as they meet the above test.

Usually in effecting the reaction, an excess of the alcohol is used as a consequence of which the potassium alcoholate remains in solution, whereas the sodium or calcium carbonate as the case may be precipitates and can be filtered from the solution. In many applications it is preferred to use the potassium alcoholate as formed in the presence of the alcohol. If desired, however, the excess alcohol can be removed by distillation to isolate the solid potassium alcoholate.

A method by which the potassium alcoholate is obtained in the continuous process is illustrated in the accompanying drawing disclosing by way of a flow sheet the apparatus and steps involved.

On the drawing:

The reference numeral 1 indicates the reactor in which the alcohol and calcium carbide or metallic sodium is reacted for the purpose of producing the desired alcoholate. Reference numeral 2 discloses a vent by which acetylene or hydrogen, as the case may be, may be removed from the reactor. The reactor 1 is provided with a stirrer 3 in order to insure agitation of the reaction mixture.

Into vessel 4, equipped with a stirrer 5, is introduced a solution of potassium carbonate in the alcohol of which the potassium alcoholate is to be formed. Alternatively, potassium carbonate may be incorporated in the vessel in the form of a bed and the alcohol passed therethrough to thereby become saturated with the potassium carbonate. The alcoholate formed in reactor 1 is pumped by pump 3a to reactor 6 while the potassium carbonate solution or suspension is pumped into the bottom of reactor 6 through pump 7a. The downcoming stream of alcoholate contacts the stream of potassium carbonate solution or suspension whereby a reaction ensues with the formation of potassium alcoholate and the precipitation of a carbonate. The potassium alcoholate is withdrawn from reactor 6 through line 7 in the form of a solution in the alcohol employed. The calcium or sodium carbonate, as the case may be, is pumped from the bottom of reactor 6 by means of pump 8 into a washing centrifuge 9. The carbonate while in the centrifuge is washed with the alcohol involved to remove from the carbonate any alcohol and potassium alcoholate entrained in the carbonate. The filtrate is then conveyed by means of pump 10 and line 11 to vessel 4 for suspending or dissolving further quantities of potassium carbonate.

The carbonate from the centrifuge 9 is conveyed to the washing centrifuge 12 where any alcohol and water is sent to a fractionation wash. The filtrate involving a solution of the alcohol and water is sent to a fractionation column. The carbonate is collected and utilized for any purposes for which it is suitable.

The potassium alcoholate solution may be subjected to distillation either at atmospheric pressure or under a vacuum for the purpose of distilling off the alcohol contained therein. In this way a pure alcoholate is obtained in high yields.

The invention is further illustrated by the following examples.

*Example 1*

1.25 mols of calcium carbide and 10 mols of methanol are introduced into reactor 1 with vigorous agitation and the reactor heated to the boiling point of the reaction mixture. The slurry of calcium methylate in methanol is then pumped by pump 3 to reactor 6.

1 mol of potassium carbonate suspended in 9 mols of methanol is introduced into reactor 4 from which the mixture is pumped to reactor 6 by pump 7a. The calcium methylate reacts with the potassium carbonate with the formation of potassium methylate and calcium carbonate. The potassium methylate dissolved in methanol is removed through line 7 and the calcium carbonate is removed through pump 8 and treated in washing centrifuge 9 with methanol and in washing centrifuge 12 with water.

*Example 2*

1.25 mols of calcium carbide, 1 mol of potassium carbonate and 19 mols of methanol are heated to reflux for a few hours until all the calcium carbide has reacted. The slurry is filtered and the clear filtrate containing potassium methylate and methanol is subjected to distillation for removal of the methanol.

*Example 3*

1.2 mols of metallic sodium and 20 mols of methanol are introduced into reactor 1. 0.47 mol of potassium carbonate suspended in methanol is introduced into vessel 4 from which it is pumped to reactor 6. In reactor 6 the potassium carbonate is contacted with the sodium methylate formed in reactor 1. As a result of the conversion in reactor 6, sodium carbonate is precipitated and withdrawn from the reactor through line 8 and treated in elements 9 and 12 as previously stated. Potassium methylate dissolved in methanol is removed through line 7.

*Example 4*

1.2 mols of metallic sodium are added to 20 mols of methanol and the resulting solution of sodium methylate is added to a reactor containing 0.47 mol of potassium carbonate. The reaction mixture is refluxed until the potassium carbonate has been dissolved. The slurry in the flask is cooled and filtered. The filtrate contains potassium methylate dissolved in methanol.

*Example 5*

The process is the same as in Example 1 excepting that the methanol is replaced by an equivalent amount of ethanol.

*Example 6*

The process is the same as in Example 3 excepting that the methanol is replaced by an equivalent amount of ethanol.

*Example 7*

The process is the same as in Example 3 except that the methanol is replaced by an equivalent amount of dodecyl alcohol.

*Example 8*

The process is the same as in Example 4 except that the methanol is replaced by an equivalent amount of benzyl alcohol.

*Example 9*

The process is the same as in Example 3 except that the methanol is replaced by an equivalent amount of furfuryl alcohol.

The potassium carbonate which is employed in the present process may be obtained by reclaiming the potassium appearing in the sludge of spent potassium alcoholate catalysts. It has been stated, for instance, that potassium alcoholates have been utilized in producing vinyl ethers by reacting acetylene with an alcohol in the presence of the alcoholate. As the reaction proceeds, the catalyst becomes degraded with the formation of a sludge containing potassium acetate, formate, methylate and hydroxide. This catalyst sludge is calcined at about 600° C. to convert the potassium content thereof into potassium carbonate. This potassium carbonate so recovered may then be used for conversion to the alcoholate for reuse in the vinylation process.

Various modifications of the invention will occur to persons skilled in the art and I accordingly do not intend to be limited in the patent granted except as required by the prior art and the appended claims.

I claim:

1. The process of producing a potassium alcoholate which comprises reacting potassium carbonate with an alcoholate selected from the class consisting of calcium and sodium alcoholates in an inert diluent which is a solvent for the potassium carbonate and a non-solvent for sodium and calcium carbonates.

2. The process as defined in claim 1 wherein said inert diluent is an alcohol.

3. The process as defined in claim 1 wherein the conversion is effected in an anhydrous medium.

4. The process as defined in claim 1 wherein the inert diluent is the alcohol corresponding to the alcoholate radical involved.

5. The process of producing a potassium alcoholate selected from the class consisting of potassium methylate and potassium ethylate which comprises reacting potassium carbonate dispersed in an alcohol corresponding to said alcoholate radical with an alcoholate selected from the class consisting of calcium and sodium methylate and ethylate at a temperature ranging from room temperature to the boiling point of the reaction mixture.

6. The process of producing potassium methylate which comprises heating calcium carbide, methanol and potassium carbonate to the boiling point of the reaction mixture and isolating the precipitated calcium carbonate from the potassium methylate.

7. The process of producing a potassium alcoholate selected from the class consisting of potassium methylate and ethylate which comprises continuously dispering potassium carbonate in an aliphatic alcohol containing not more than 2 carbon atoms and continuously reacting the potassium carbonate with an alcoholate of calcium in which the alcohol radical is aliphatic and contains not more than 2 carbon atoms at a temperature ranging from room temperature to the boiling point of the resulting mixture.

8. The process of producing potassium methylate which comprises continuously dispersing potassium carbonate in methanol, continuously contacting sodium methylate with the potassium carbonate solution and continuously isolating the sodium carbonate formed in the reaction from the potassium methylate.

WILLIAM E. HANFORD.

REFERENCES CITED

The following references are of record in the file of this patent:

UNITED STATES PATENTS

| Number | Name | Date |
|---|---|---|
| 2,278,550 | Loder | Apr. 7, 1942 |

FOREIGN PATENTS

| Number | Country | Date |
|---|---|---|
| 279,095 | Great Britain | Oct. 14, 1926 |

OTHER REFERENCES

Chablay, "Compt. rend." vol. 153, pages 818–21 (1911).